Jan. 12, 1932.  W. F. KIEPER ET AL  1,840,816
EMBOSSING PLATE
Filed March 11, 1930
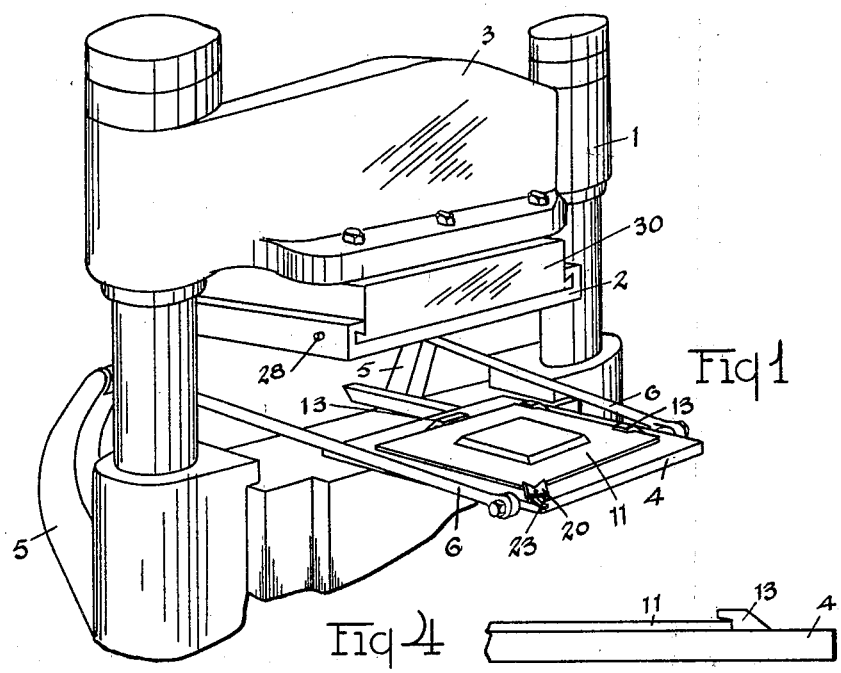
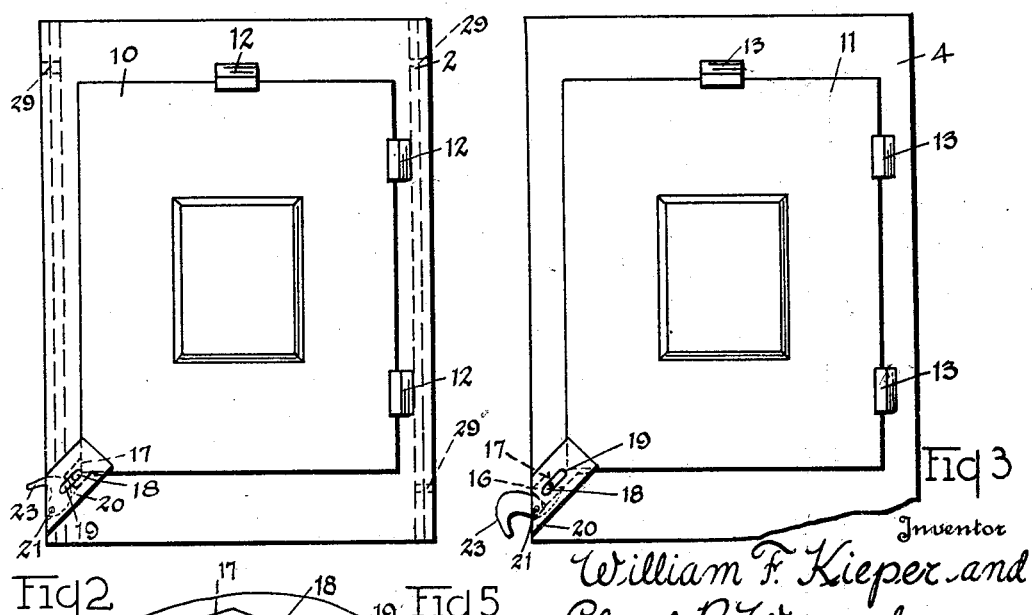
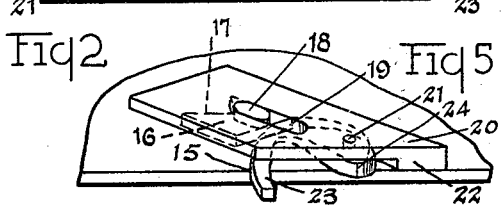

Patented Jan. 12, 1932

1,840,816

UNITED STATES PATENT OFFICE

WILLIAM F. KIEPER, OF TOLEDO, OHIO, AND CLAUDE B. WAGENHAUSER, OF TEMPERANCE, MICHIGAN

EMBOSSING PLATE

Application filed March 11, 1930. Serial No. 434,928.

Our invention has for its object to provide replaceable embossing plates whereby a simple die may be removed from an embossing press and subsequently replaced for a continuance of the run. The invention thus provides an embossing means that may be made up and used for embossing and then stored away for future use instead of, as is commonly done, preparing a new simple die each time that the same embossing is to be performed. Thus, the invention enables a run of any number at one time, use of the machine for performing some other embossing or press work, and again continuing with the first embossing, or the embossing plates may be stored away and used at some more distant time for running out the same embossing line.

The invention thus provides an exceedingly convenient means for handling simple dies and results in the saving of the labor of preparing make-readies for the same lines. It also economizes time in view of the drying that is required in connection with certain kinds of embossing jobs, since it enables the removal of the embossing plates and the use of the machine for other purposes, while a part of the embossing job is drying, and subsequent replacement of the plates for the continuance of the embossing operations.

The invention may be contained in structures that are of different forms, and, to illustrate a practical application of the invention, we have selected a pair of embossing plates and means for securing the same in alignment in the embossing press, as illustrative of embodiments of my invention. The invention selected is shown in the accompanying drawings, and will be described hereinafter.

Fig. 1 illustrates a perspective view of a part of the press. Fig. 2 is a view of one of the embossing plates. Fig. 3 is a view of the other of the embossing plates. Fig. 4 is an edge view of part of the embossing plate shown in Fig. 3, and illustrates an end view of one of the guides used in securing the embossing plates to the base plate, or to the presser plate of the machine. Fig. 5 is a perspective of a lock.

The press 1 is provided with the presser plate 2 that is connected to the cross-head 3 of the machine, and which is moved vertically and reciprocally in the manner well known in connection with press work. The machine is also provided with a movable bed plate 4, which is moved horizontally and reciprocally by a suitable means, such as the swinging arms 5 and the links 6, also in the manner well known in the art. The bed plate 4 is reciprocated back and forth to receive and to deliver the paper or other sheet material that is to be embossed by the pressure produced between the presser plate 2 and the bed or base plate 4, the material being shaped according to the respective configurations on the surfaces of the simple die, and the metal dies that are attached to the embossing plate. The simple die embossing plate is secured to the bed plate 4 and a metallic die is attached to the presser plate 2.

The simple die and the metallic die is formed in the manner well known in the art, but are formed and secured to the embossing plates. The metal die is connected to the embossing plate 10, and the simple die is formed on the plate 11. The presser plate 2 is provided with connecting lugs 12, and the bed plate 4 is provided with the connecting lugs 13. The connecting lugs coact to secure the plates 10 and 11 in position. The lugs 12 and 13 have portions that extend over the edges of the plates 10 and 11 when they are inserted in position. They are located along adjoining side edges of each of the plates 10 and 11 and are so disposed relative to each other that the lugs 12 will be located on one side of the presser plate and the bed plate, and the lugs 13 will be located on opposite sides of the presser plate 2 and the bed plate 4. Each of the plates 10 and 11 is locked in position by means of the cam lock 15 located in one corner of its respective supporting plate. The lock 15 is provided with a shuttle member, or block, 16 having a V-shaped reentrant edge portion 17 located in one end thereof. The shuttle has an oblong pin 18 that moves in the slot 19 formed in a housing 20 that extends over the top of the shuttle 16. The housing 20 is secured in the one case to the presser plate 2 and in the other case to the bed plate 4. The housings 20 are so disposed as to enable corners of the plates 10 and 11 to be slipped under the ends of the housings 20 and so as to locate the shuttle 16 in line with the corner of the plates 10 and 11 when they have slipped under the lugs 12 and 13 that are secured to the presser plate 2 and the bed plate 4. The plates 10 and 11 are relatively thin plates and the overhanging housings 20 together with the lugs 12 and 13 operate to hold the plates 10 and 11 against the presser plate and bed plate. The shuttle 16 operates as a clamp to clamp the plates 10 and 11 in position against the lugs 12 and 13.

In order to locate each shuttle 16 in its clamping position, the cam member 24 is pivotally connected between the housing 20 and the supporting plate. The cam 15 is so formed that it will engage the side edge of the shuttle 16 located nearest to the nearest corner of the supporting plate. The cam 24 is so formed as to permit the extended movements of the shuttle 16 to permit the plate that is engaged thereby to move a considerable extent within the housing to allow for the engagement of the plates with the lugs. Also, the cam 24 is so formed that, when it pushes the shuttle 16 into clamping position, the portion of the cam surface of the cam located most remote from the pivot pin 21 of the cam will have passed the outer edge of the shuttle block 16 when the cam 24 comes to a stop against the side wall 22 of the housing 20. Any return movement of the cam 24 will be resisted by the pressure of the shuttle block 16 against the plate. The cam 24 is provided with a finger 23 which may be seized and forcibly drawn to pull the high point of the cam by the engaging outer edge of the shuttle 16 to release the shuttle. The plate that is engaged by the shuttle may then be shifted relative to the housing 20 and released from the engaging lugs of the supporting plate.

The presser plate 2 may be secured in position relative to the crosshead by means of pins 28 located in the opening 29 formed in the side flanges of the plate 2 and which enter a part 30 connected to the crosshead.

Thus the embossing plates 10 and 11 may be readily removed from the supporting plates and replaced in position and, when so placed, they will be aligned one relative to the other and, consequently, the plates may be reused for producing the same embossing without preparing a new simple die by the use of the die in the manner well known in the art.

We claim:

1. In combination with a press having a presser plate and a bed plate, a pair of embossing plates, an embossing die connected to one of the embossing plates, a simple die connected to the other of the embossing plates, a cam locking member, and a plurality of lugs connected to each of the presser plate and the bed plate, a shuttle block operated by the cam for engaging the corner of each of the embossing plates, the shuttle block operating to push each presser plate against the lugs to locate the simple die in alignment with the embossing die.

2. In combination with a press having a pressure plate and a bed plate, a pair of embossing plates, an embossing die connected to one of the embossing plates, a simple die connected to the other of the embossing plates, a plurality of lugs connected to the pressure plate and the bed plate, and means for locating the embossing plates against the lugs to locate the embossing die in alignment with the simple die.

In witness whereof we have hereunto signed our names to this specification.

WILLIAM F. KIEPER.
CLAUDE B. WAGENHAUSER.